United States Patent [19]
Lima et al.

[11] 3,983,340
[45] Sept. 28, 1976

[54] AUTOMATIC SPAN LINE SWITCH

[75] Inventors: Paul J. Lima; Todd V. Townsend, both of Washoe County, Nev.

[73] Assignee: Lynch Communication Systems, Inc., Reno, Nev.

[22] Filed: Jan. 27, 1975

[21] Appl. No.: 544,483

[52] U.S. Cl. .................................. 179/175.3 S
[51] Int. Cl.² .................................... H04B 3/46
[58] Field of Search ............ 179/175.3 R, 15 BF, 179/175.31 R, 175.3 S; 340/147 SC

[56] References Cited
UNITED STATES PATENTS

| | | | |
|---|---|---|---|
| 2,680,162 | 6/1954 | Brehm et al. | 179/175.3 R |
| 2,827,516 | 3/1958 | Morris | 179/15 AT |
| 2,889,408 | 6/1959 | Trousdale | 179/15 AT |
| 3,061,685 | 10/1962 | Peach | 179/15 AT |
| 3,275,749 | 9/1966 | Kunihiro et al. | 179/15 AT |
| 3,281,536 | 10/1966 | Dupieux et al. | 179/15 AT |
| 3,317,675 | 5/1967 | Harris et al. | 179/18 |
| 3,364,467 | 1/1968 | Haibt et al. | 179/175.3 R |
| 3,493,683 | 2/1970 | Schlichte | 179/15 |
| 3,603,736 | 9/1971 | Morroll | 179/15 BF |
| 3,715,503 | 2/1973 | Jungbluth et al. | 179/15 BF |
| 3,864,533 | 2/1975 | Erlund | 179/175.3 R |
| 3,865,991 | 2/1975 | Charransol et al. | 179/15 BF |

Primary Examiner—Douglas W. Olms
Attorney, Agent, or Firm—Phillips, Moore, Weissenberger, Lempio & Strabala

[57] ABSTRACT

An automatic span line switch for PCM communication lines is disclosed which isolates alarm conditions to an actual span line failure, as distinguished from failures in the terminal equipment. In addition, the switch uses a specific code transmission to provide fast switching and to permit identification of the direction of failure. Although the circuit is capable of switching span segments individually and independently, it can transmit an alarm to a distant central office and automatically establish an appropriate test loop in the presence of test transmissions when needed to permit single-end troubleshooting. The switch further tests the dead line continuously and stringently for error-free data transmission, and automatically resets without disturbing traffic when the trouble has been corrected. An extremely flexible priority system for selected channels is also provided, and the circuitry on both ends of all channels (including the protective channel) is identical to minimize parts inventory costs.

9 Claims, 16 Drawing Figures

FIG_1

FIG_2a

FIG_2b

FIG_2c

FIG_2d

FIG_2e

FIG_2f

FIG_8

FIG_3

FIG_4A

FIG_4B

FIG_9

FIG_10

AUTOMATIC SPAN LINE SWITCH

BACKGROUND OF THE INVENTION

In the telephone art, voice or data communications are frequently carried on over pulse code modulated transmission lines which multiplex a number of subscriber circuits onto a common PCM channel.

Between central offices, these PCM channels are carried over so-called spans consisting usually of multiwire cables provided with repeaters at regular intervals. The repeaters maintain the pulse trains within acceptable tolerances throughout the cable. Occasionally, however, a failure occurs in one of the repeaters which renders one of the span lines unserviceable. In this event, it is desirable to temporarily switch the affected circuit or "service" span over to a spare span provided for that purpose and known as the "protective" span, with the least possible loss of PCM signal. In this manner, interruption of traffic due to the failure of the single span line in a cable can be effectively prevented.

Automatic span line switches to accomplish this result have been known for some time. As a matter of example, such a device is shown in U.S. Pat. No. 3,715,503 entitled "Automatic Transfer Arrangement for Telephone System".

The prior art span switches, though serviceable, did, however, have some significant defects. For one, they were unable to determine whether a channel had failed due to span trouble or due to trouble in the channel equipment at the terminal, in which latter case the substitution of a protective span for the affected service span would not solve the problem.

For another, prior art devices were unable to recognize the direction in which a span had failed. Consequently, maintenance personnel had to either pick an end from which to test the span and hope they picked the right one, or travel to one end of the span, loop the line, go back and test from the other end, and then return to the first end and disconnect the loop.

With an increasing number of central offices being normally unattended, a problem also arose from the fact that prior art span switches were unable to advise the nearest manned central office of a span failure between two unmanned central offices without requiring special dedicated supervisory channels for that purpose.

Although some prior art systems did have the capability of automatically resetting when the service span became operable again, the two ends of the span were not able to reset sufficiently simultaneously to prevent significant interference (in the form of an audible click or a customer-discernible loss of data) with the traffic on the affected channel.

Finally, although rudimentary priority systems have previously been known in the art, they consisted simply of grouping lines into a pair of groups, the lines of one group having priority over the lines of the other. In practice, however, it is often necessary to establish more specific orders of priority and to make at least some of these orders changeable without rewiring the frame on which the span line switch is mounted.

SUMMARY OF THE INVENTION

The present invention overcomes these and other problems by incorporating the following features: (1) the device of this invention has the capability of isolating span troubles by transmitting and monitoring its own signal when signal transmission from the channel equipment is lost; (2) the device of this invention recognizes the direction in which the span has failed by transmitting special code words in both directions upon occurrence of a failure and determining in which direction the transmission is inoperative; (3) the invention provides special timing arrangements which permit transmission of the error signal to a distant central office without triggering the span switches of intermediate spans; (4) the system of the invention resets both ends of the span simultaneously to continue data transmission over the affected channel during resetting with no significant loss of data; (5) the system of the invention provides an extremely flexible priority arrangement which assigns an individual priority to each of the channels and permits changing the priority of any channel to the first, second, or third priority level while the channel is in use without interfering with traffic on the channel; and (6) the invention provides for automatic looping of any given end of a failed span whenever the apparatus of that end detects both that the failure is outgoing from that end, and that a fault-locating test signal is being injected into the span.

It is therefore the object of the invention to provide a span switch capable of isolating error conditions to span line trouble situations.

It is another object of the invention to provide a span line switch capable of recognizing the direction in which the span has failed.

It is still a further object of the invention to provide a span line switch which automatically loops the line at the proper end by sensing when a failure-locating test signal is applied to the line while the line is in a failed condition.

It is another object of the invention to provide a span line switch capable of transmitting error indications to distant central offices without triggering adjacent span switches on the same channel.

It is yet another object of the invention to provide a span switch capable of transferring to a protective span at the earliest possible time after occurrence of a failure and to reset sufficiently simultaneously to prevent any customer-discernible interference with traffic.

It is still another object of the invention to provide a highly flexible priority system for the various channels of the channel bank, in which the priority of a channel can be changed at will without interference with traffic on that channel.

It is yet a further object of the invention to provide a span switch of the type described which is highly discriminating against transients on the line and against false error indications.

It is yet another object of the invention to provide a span switch of the type described in which the common equipment of the span switch provides redundancy and internal monitoring to minimize internal failure of the span switch apparatus.

DESCRIPTION OF THE PREFERRED EMBODIMENT

I. In General

Figure 1:
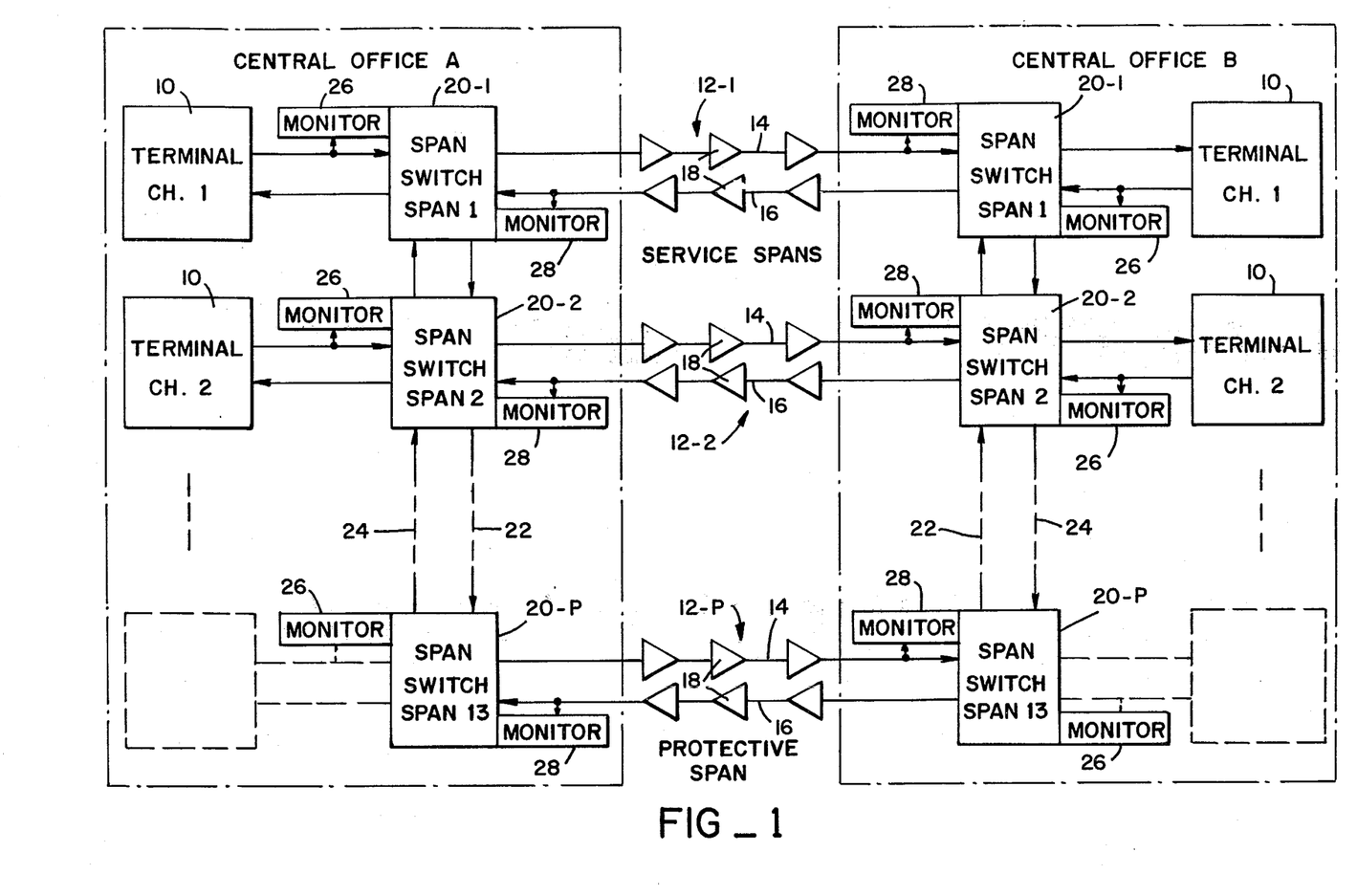
FIG. 1 is a schematic representation illustrating the environment in which the device of the invention is used.

FIG. 1 shows the environment in which the device of this invention is used. A pair of central offices A and B each have a plurality of terminals 10 containing channel equipment of an appropriate type, the exact nature of which is not material to this invention. Suffice it to say that the channel equipment transmits and receives a PCM signal representative of customer traffic, the PCM signal being commonly in bipolar format and having a pulse rate of 1.544 MHz. The channel equipment typically goes into a local alarm mode if it fails to receive an intelligible PCM signal with proper framing pulses for 350 milliseconds.

The central offices are connected by repeatered service spans 12-1, 12-2, etc, one for each channel. Customarily, there are 24 voice channels to a terminal and the invention described operates with from 1 to 24 such terminals. With a single shelf, as described herein, the invention protects up to 12 such terminals. Each span 12 is made up of a forward line 14 (forward, for the purposes of this specification, being defined as the direction from A to B) and a return line 16 (the signal path from B to A), both being equipped with repeaters 18.

For the purposes of the invention, a 13th span, the protective span 12-P, is added between the central offices A and B, and in each central office, span switches 20-1, 20-2, etc. are interposed, respectively, between each terminal 10 and the span associated therewith. The span switch 20-P associated with the protective span 12-P is not normally connected to any terminal 10, although there is no technical reason why the protective span could not also be used as a service span for an extra low-priority channel (dotted-line equipment in FIG. 1) when it is not being used for protection of a service span. The span switches 20 at each central office are interconnected by a forward transfer bus 22 and a return transfer bus 24.

As will be described more in detail hereinafter, each span switch 20 has, as an integral part thereof, a pair of monitoring units 26 and 28. The monitoring units 26 monitor the incoming signal from the channel equipment in terminals 10 and inject a steady stream of "1" pulses (to keep the span alive and to keep its repeaters from oscillating into a false signal mode) whenever the incoming signal is lost (or nonexistent, as in the case of the protective span). The monitoring units 28 monitor the incoming span lines at each central office for excessive bipolar violations and for loss of signal, the two most obvious failure parameters. Monitoring of bipolar violations at units 26 is unnecessary, because a sustained failure of this type in the terminal 10 will eventually take the channel equipment out of service, and a span which has transferred because of this failure will promptly reset.

As soon as a span failure is detected on a service span such as 12-1 by a monitoring unit 28, the channel associated with the failed span is automatically transferred, after only a 30 microsecond disconnection, to the protective span 12-P over the transfer buses 22 and 24 in a manner hereinafter described. Twenty-one seconds after the failed service span is restored to operative condition, the affected channel is reset, instantaneously and simultaneously at both central offices, to resume operation over the restored service span. If the protective span is itself inoperative, no transfer can take place; and if a higher-priority channel fails while a lower-priority channel is on the protective span, the higher-priority channel seizes the protective span, and resets the lower-priority channel to its assigned service span. Likewise, if the protective span is in use, it cannot be seized by another channel unless that channel has a higher priority.

II. Transfer and Reset

Turning first to FIGS. 2a through 2f, it will be seen that the heart of the inventive device's novel operation is the use of code sequences for transmitting failure, restoration, and switching information between central offices over the failed span itself to provide information not only of the span status but also of the direction in which the failure occurred, for purposes hereinafter explained.

Figure 2A:
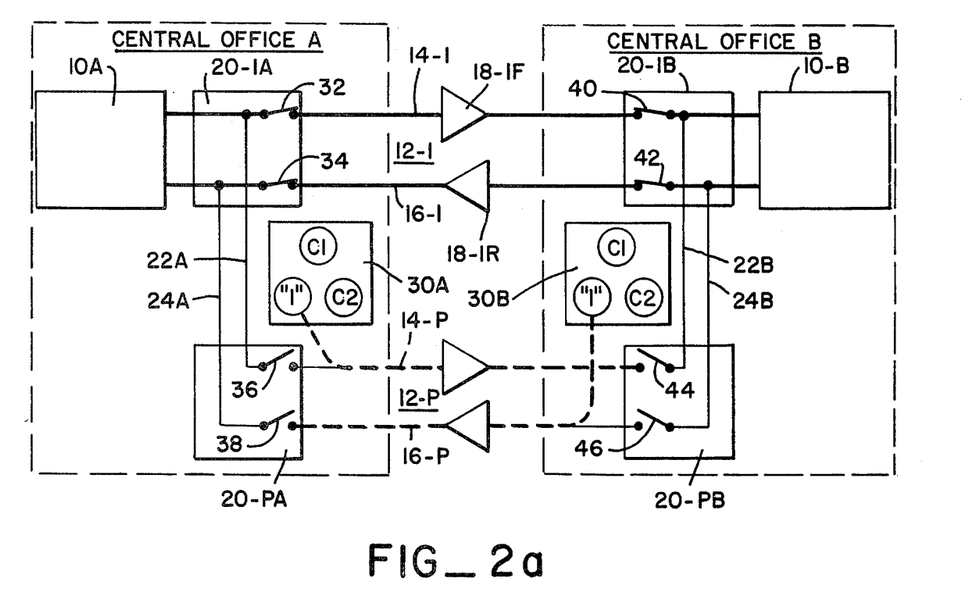
FIG. 2a through FIG. 2f are schematic representations illustrating the sequence of events as the device of the invention copes with a span line failure.

FIG. 2a shows the normal situation with all spans operational. The forward PCM signal from terminal 10A goes through span switch unit 20-1A including closed electronic switch 32, forward span line 14-1 of service span 12-1 including repeater 18-1F, and span switch unit 20-1B including closed electronic switch 40 to terminal 10B. Likewise, the return PCM signal from terminal 10B proceeds to terminal 10A over the return line 16-1 of service span 12-1 and repeater 18-1R by virtue of the closure of electronic switches 34 and 42. At the same time, the code generators 30A and 30B keep the protective span 12-P alive by transmitting a train of "1" pulses from generator 30A over forward line 14-P to the open electronic switch 44, and from generator 30B over return line 16-P to the open electronic switch 38, respectively.

Figure 2B:
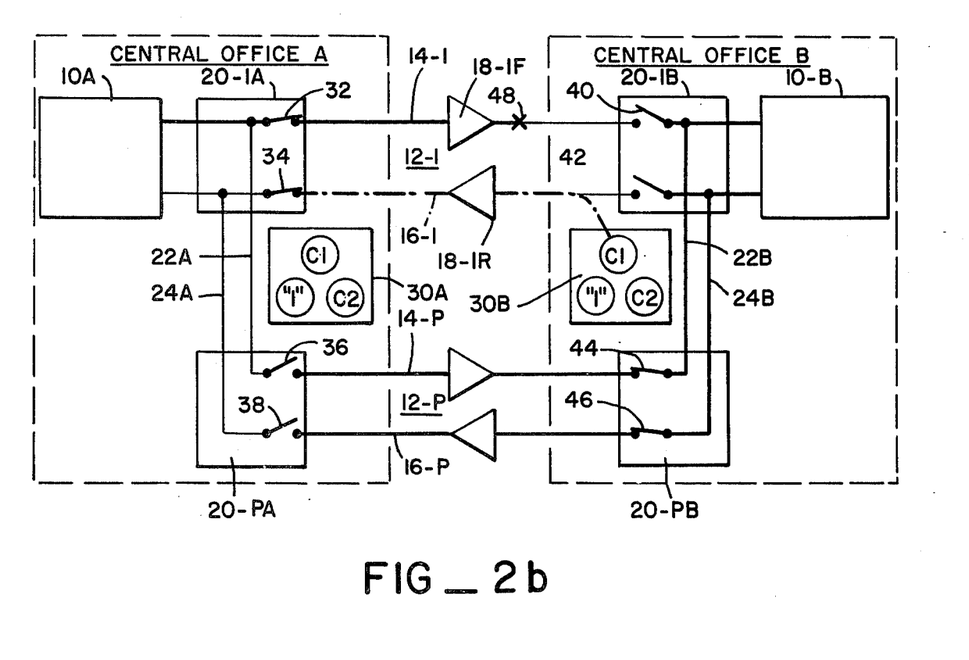

If a fault now occurs at point 48 in forward line 14-1 (e.g., a failure of repeater 18-1F), the detection of the fault by the monitor 28 (in FIG. 1) of span switch unit 20-1B causes a transfer at central office B. The transfer at B opens electronic switches 40, 42 and closes switches 44, 46 in span switch unit 20-PB. However, switches 36, 38 in switch unit 20-PA are still open, and terminals 10A and 10B are momentarily disconnected from each other. Simultaneously with the transfer at B, code generator 30B injects code C1 into the return line 16-1, which is still operational even though span 12-1 is unusable for customer purposes.

Figure 2C:
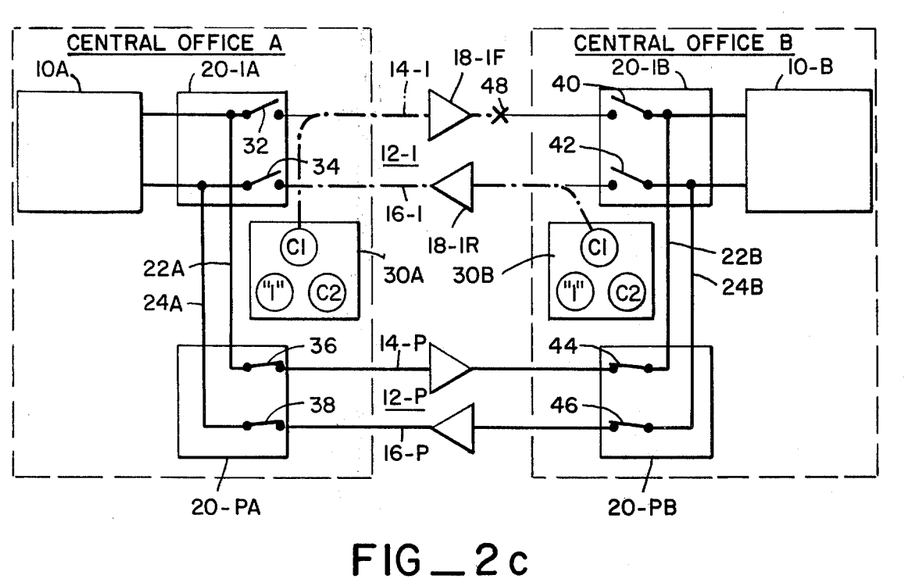
Figure 2D:
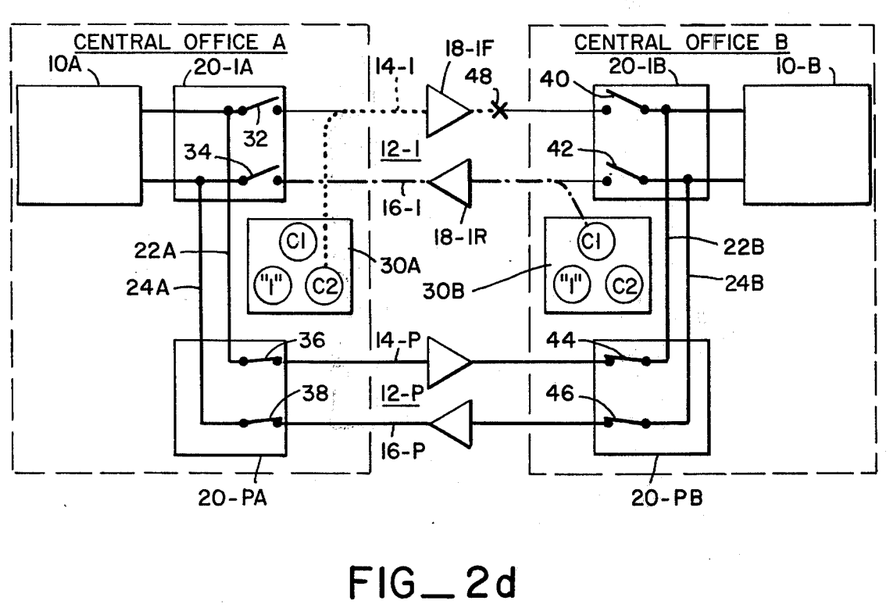

Receipt of code C1 by span switch unit 20-1A for 30 microseconds or more causes a transfer to occur at central office A. As shown in FIG. 2c, the customer communication path between terminals 10A and 10B is now re-established in the forward direction through bus 22A, switch 36, line 14-P, switch 44, and bus 22B; and in the return direction, through bus 24B, switch 46, line 16-P, switch 38, and bus 24A. Simultaneously, code generator 30A injects code C1 into the failed line 14-1.

Whenever a span switch unit 20 receives twenty-one seconds of fault-free signal from its span while operating in a transferred mode, its code generator switches from code C1 to code C2. Consequently, and inasmuch as return line 16-1 is still operational, the conditions of FIG. 2c are replaced, after a twenty-one second interval, by the conditions of FIG. 2d. Inasmuch as the fault 48 is still present, the C2 signal from code generator 30A does not reach span switch unit 20-1B. The circuit now remains in the condition of FIG. 2d until the fault 48 is cleared either by clearance of the fault-causing condition or by the intervention of maintenance personnel.

Figure 2E:
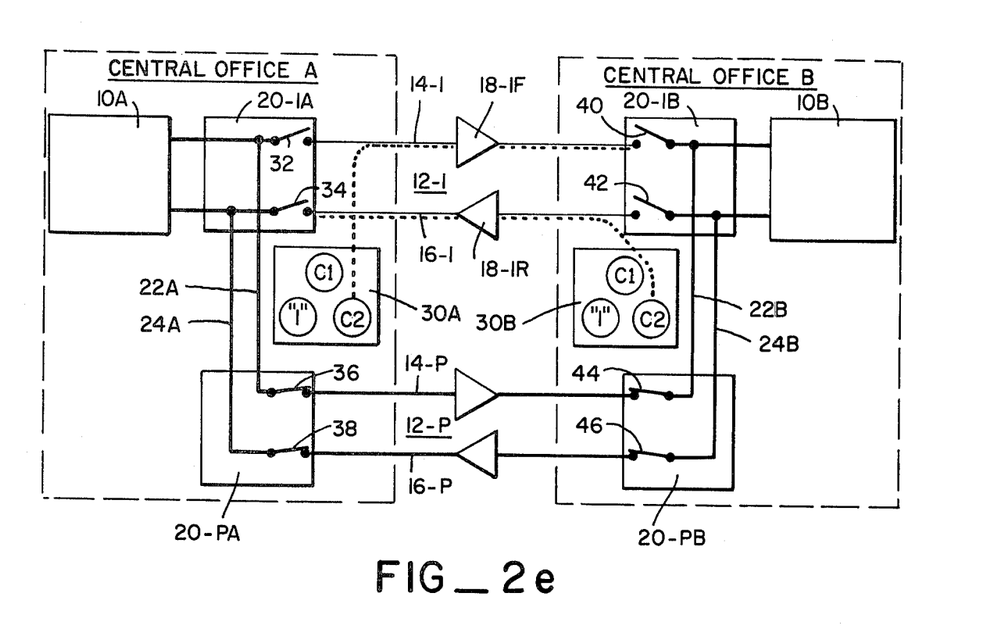
Figure 2F:
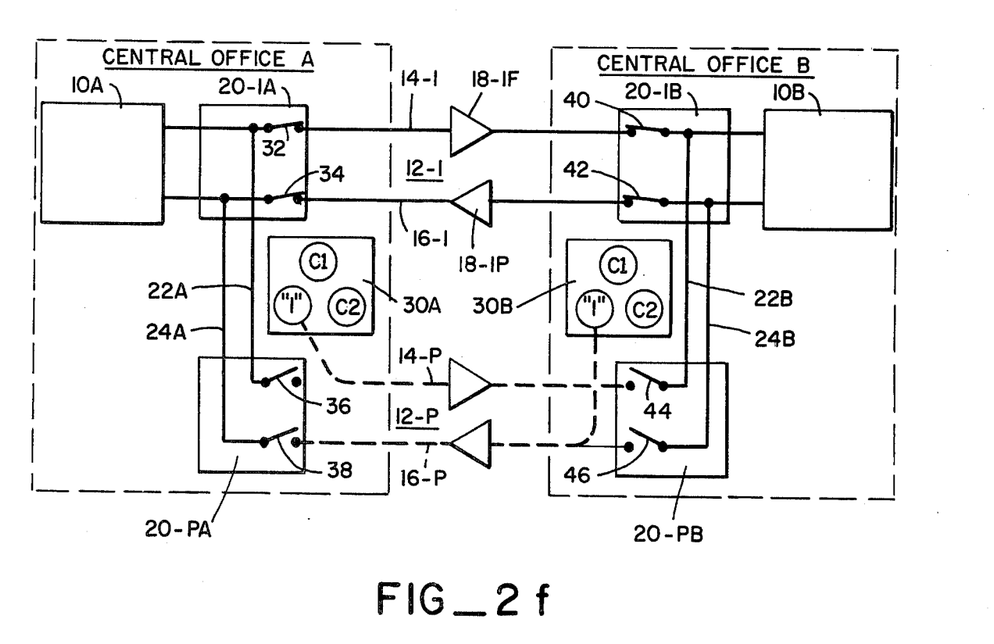

As soon as the fault 48 is cleared, C2 code (which is a valid signal as far as the monitoring units are concerned) starts to reach span switch unit 20-1B. Twenty-one seconds later, code generator 30B also starts transmitting code C2 (FIG. 2e). Thirty microseconds after a span switch unit 20 both receives and sends code C2, it resets (FIG. 2f). Consequently, (disregarding any transmission delays in the span) central offices A and B reset simultaneously, thereby preventing any line clicks or loss of customer data during the resetting operation.

The resetting ends any code transmission by the code generator 30A and 30B, and the circuit is now once again in the normal condition of FIG. 2a.

Figure 3:
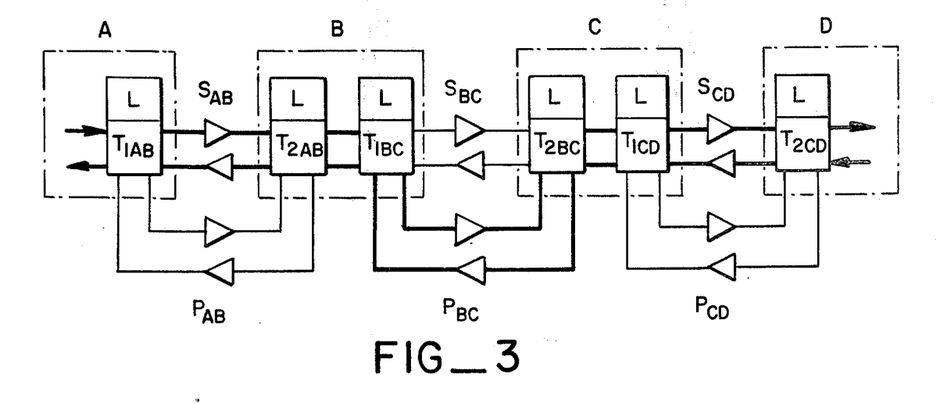
FIG. 3 is a schematic representation illustrating the isolation of a span transfer to a single section of a channel extending between a plurality of central offices.
Figure 8:
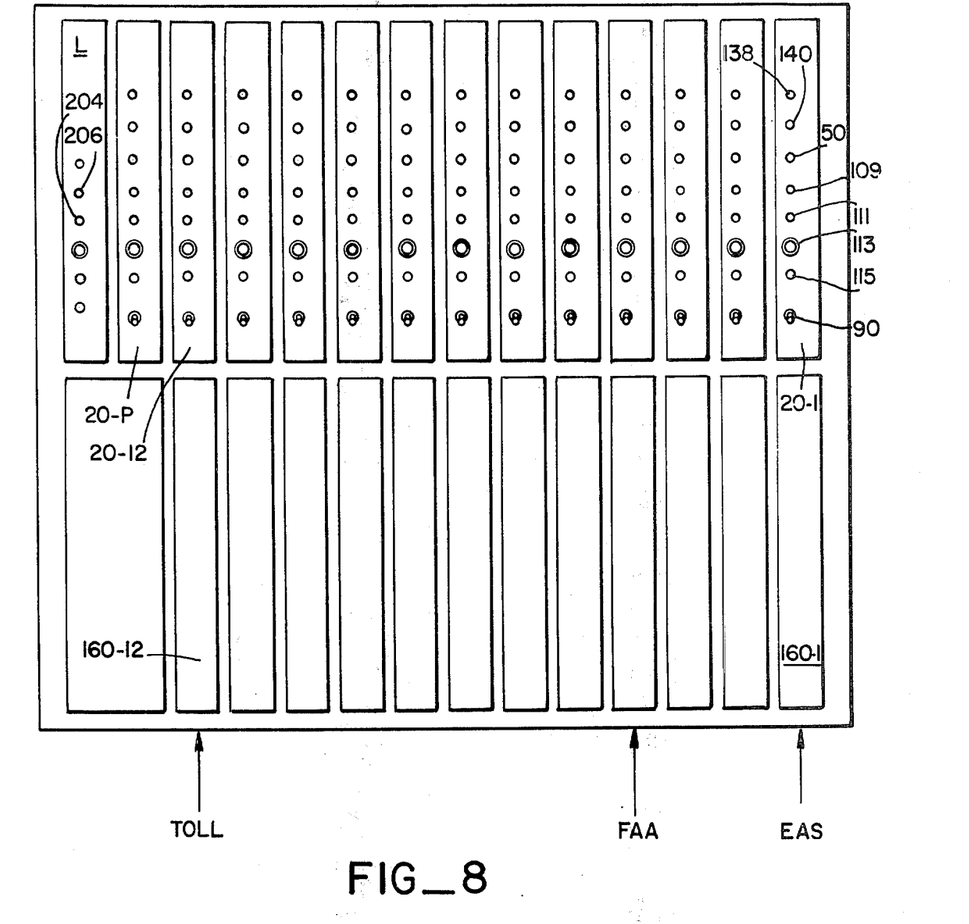
FIG. 8 is an elevational view of an equipment rack containing a channel bank and a corresponding span line switch set in accordance with the invention.

FIG. 3 shows how an alarm condition at any point of a line extending through several central offices can be transmitted to a distant central office without causing unaffected spans to switch. FIG. 3 shows four central offices A, B, C, and D each connected to the next by a service span S and a protective span P. Each set of spans is equipped with a pair of span switches T, one at each end. Each span switch T contains an alarm board L. The physical appearance of the alarm board L is shown in FIG. 8, and it will be noted that each board has a "line fail" light 50. The circuitry of the span line switches T is so arranged and timed, as hereinafter described, that whenever a span line switch T receives or sends code C1 for 10 microseconds, the line fail light comes on. It will be recalled that the transfer to the protective span does not occur until the C1 code has persisted for 30 microseconds.

Let us now suppose that a break occurs in service span $S_{BC}$ as indicated by "X" in that span. Upon the occurrence of the break 48, span line switch $T_{2BC}$ immediately starts to transmit code C1 toward the left over the as-yet functional return line of service span $S_{BC}$. This C1 code is propagated through $T_{1BC}$, $T_{2AB}$ and service span $S_{AB}$ to span line switch $T_{1AB}$. When the C1 code transmitted by switch $T_{2BC}$ has persisted for 10 microseconds, the line fail lights in switches $T_{1BC}$ and $T_{1AB}$ (switches $T_{2BC}$ and $T_{2AB}$, being on the sending end of their respective spans, do not see C1 at their code receivers) come on. At the same time that it transmits code C1 to the left, span line switch $T_{2BC}$ also transmits code C1 for only 20 microseconds to the right through switch $T_{1CD}$ and the forward line of span $S_{CD}$ to span line switch $T_{2CD}$. After 10 microseconds, this will also cause the "line fail" lights in switch $T_{2CD}$ to come on.

When any span line switch such as $T_{1BC}$ has received code C1 for 20 microseconds, the span line switch circuit blocks further propagation of the C1 signal through the switch and therefore prevents any further C1 code from reaching switches $T_{2AB}$ and $T_{1AB}$. Consequently, at the expiration of the 30 microsecond period from the first appearance of the C1 code, switches $T_{1AB}$ and $T_{2AB}$ no longer see any C1 code and therefore do not transfer. Likewise, switches $T_{1CD}$ and $T_{2CD}$ no longer see any C1 code and therefore also do not transfer. $T_{1BC}$ and $T_{2BC}$, however, continue to see code C1, and at the expiration of 30 microseconds these two span line switches switch the service span $S_{BC}$ onto the protective span $P_{BC}$. From this point on, the spans extending between central offices B and C continue to function in the failure mode until service is restored as hereinabove described, while the spans extending between central offices A and B and between C and D continue functioning normally as if no break had occurred. However, the line fail lights, which are equipped with a lock-in circuit, remain lit in all four central offices, and if any one of these offices is manned, a failure indication will promptly be conveyed to maintenance personnel.

Figure 4A:
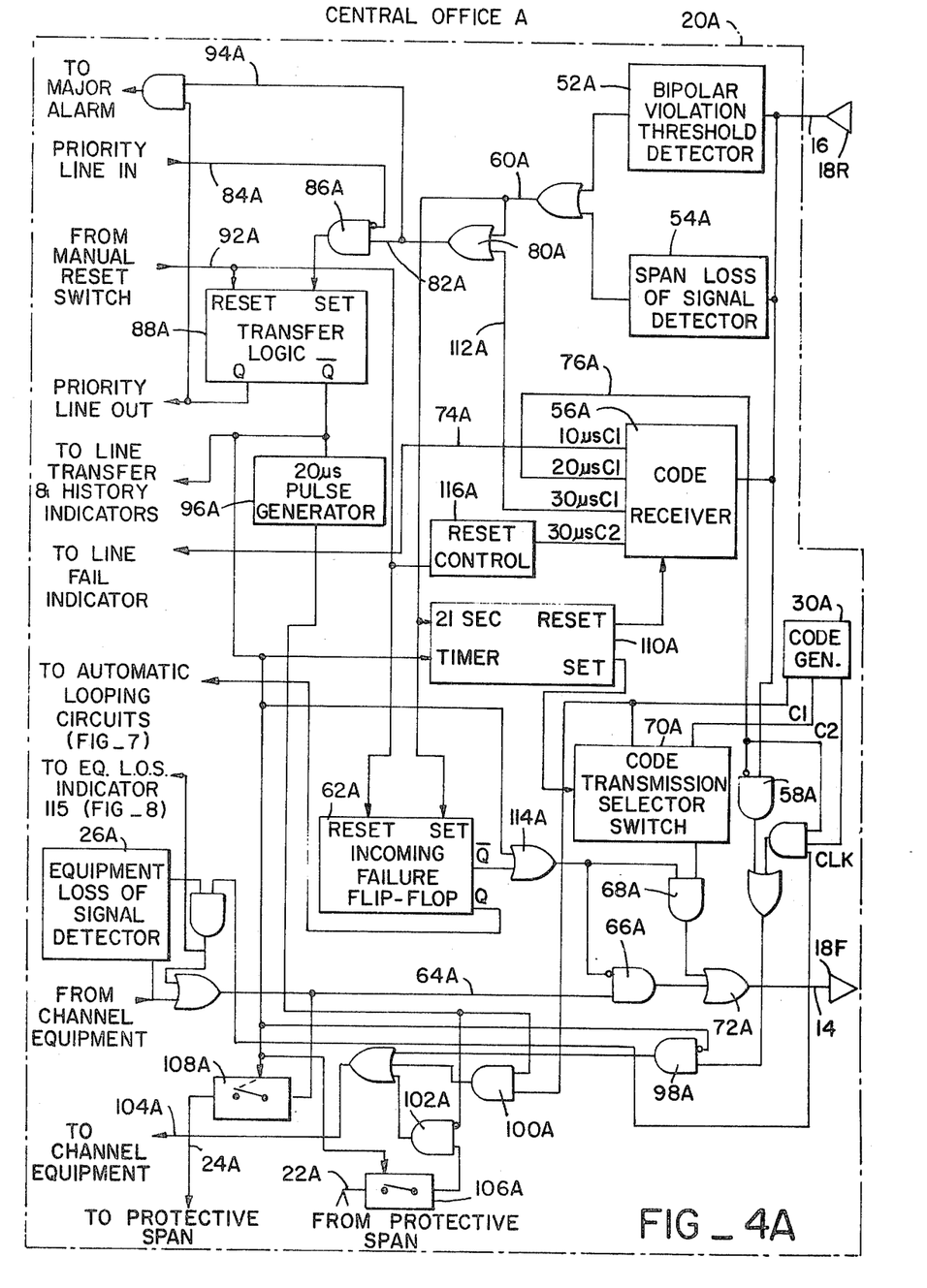
FIGS. 4A and 4B together constitute a block diagram showing those portions of the inventive device on each end of a span which are involved in the transfer and reset process.
Figure 4B:
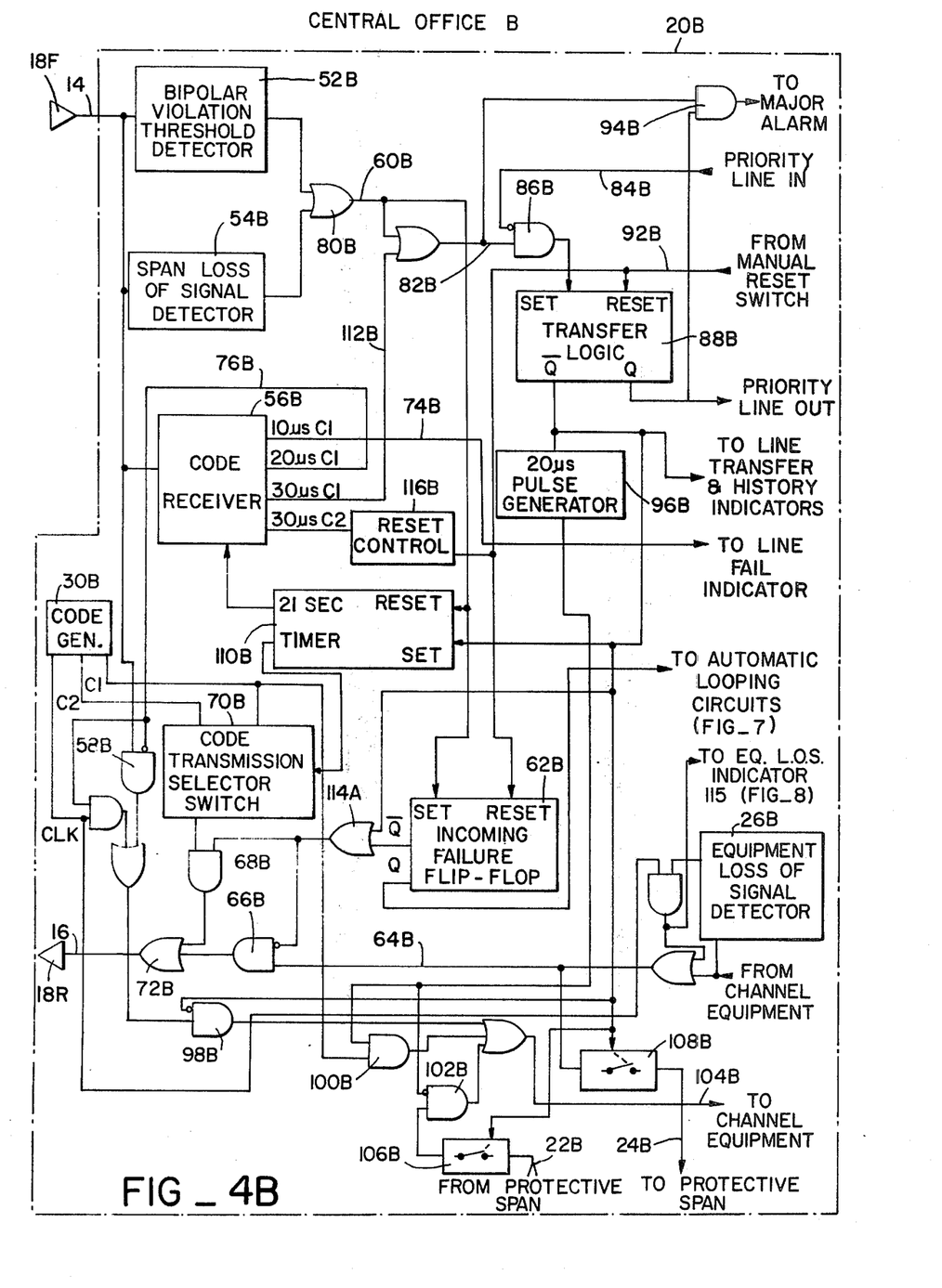

For a description of how the functions of FIGS. 2a through 2f and 3 are performed, we now turn to FIG. 4. FIG. 4A shows the transfer-and-reset equipment of a span switch unit 20 at central office A, while FIG. 4B shows the identical equipment in the corresponding span switch unit 20 at central office B. Under normal circumstances, a PCM data signal enters span switch unit 20B from repeater 18F over forward span line 14. The incoming signal is applied to bipolar violation threshold detector 52B (described in more detail in FIG. 6), loss-of-signal detector 54B, code receiver 56B (described in more detail in FIG. 5) and AND gate 58B. The detectors 52B and 54B together constitute the monitoring unit 28 of a span switch 20 in FIG. 1. The outputs of detectors 52B and 54B are OR'd together to produce an "incoming failure" signal on line 60B. This signal sets incoming failure flip-flop 62B and causes the substitution of code C1 for the PCM signal from line 64B on return span line 16. The substitution is accomplished by cutting line 64B off at AND gate 66B and enabling AND gate 68B to feed C1 into line 16. from code generator 30B (which generates its codes continuously) through code transmission selector switch 70B (which is normally set to select C1) and OR gate 72B.

The C1 code transmitted from central office B over return span line 16 is picked up by code receiver 56A at central office A. The code receivers 56 are normally set to listen only for code C1 (which may be, for example, 100100 repeated indefinitely) and to ignore C2 (which may be, for example, 110110 repeated indefinitely). When code receiver 56A has received code C1 steadily for ten microseconds, it sends out a pulse on line 74A which lights and locks in the line fail light 50 (FIG. 8) for the span involved. It will be noted that code C1 at this time propagates all the way through central office A and therefore also lights the line fail light in all upstream receiving span switch units 20 along the affected channel.

After code receiver 56A has received code C1 for 20 microseconds, line 76A goes to logic "1" and cuts off further propagation of the C1 signal coming in from return line 16 by negating the inverted input and AND gate 58A for 26 microseconds, during which time gate 78A injects a stream of "1" pulses into the channel in the upstream direction. As previously explained, the cut-off of C1 propagation after 20 microseconds prevents operational upstream spans on the same channel from being transferred.

The incoming failure signal on line 60B causes OR gate 80B to produce a transfer order signal on line 82B. If the priority line 84B into the span switch unit under consideration is a logic "0" (see the discussion of the priority system hereinbelow), the transfer is permitted, and gate 86B transmits a transfer command to the "set" terminal of transfer logic flip-flop 88B. If desired, a transfer can be manually prevented by energizing the "reset" terminal of transfer logic 88B from manual reset switch 90 (FIG. 8) over line 92B. If a transfer order appears on line 82B but the transfer logic 88B fails to transfer for any reason (e.g., when a higher-priority span has already seized the protective span), traffic is lost on the affected channel, and AND gate 94B triggers a major alarm (FIG. 10) to summon maintenance personnel.

The transfer logic 88B, it will be noted, sets immediately upon detection of an incoming failure. Its setting blocks gate 98B and energizes a pulse generator 96B which produces a single 20 microsecond pulse. This pulse is applied to gates 100B and 102B as shown and feeds code C1 directly from the code generator 30B into the channel equipment of central office B in a forward direction over line 104B for 20 microseconds. This burst of C1 lights the downstream line fail lights but is insufficient to transfer any downstream spans of the affected channel.

The setting of transfer logic 88B closes electronic transfer switches 106B and 108B, which divert traffic onto the protective span buses 22B and 24B, respectively. At the same time, the setting of the transfer logic 88B starts the 21-second timer 110B for a purpose hereinafter described. It also lights the "line transfer" light 109 and "history" light 110 (FIG. 8). The former indicates a line "transfer" progress, the latter locks in and holds the transfer indication until manually reset by reset button 113.

At this point, central office B has transferred but central office A has not yet done so, as there has been no failure in return line 16. However, when code receiver 56A receives code C1 for 30 microseconds, line 112A becomes energized and a transfer order is issued through OR gate 80A. This in turn causes the transfer logic 88A to set (assuming that a transfer is permitted), and traffic can resume over the protective span.

With gate 98A disabled by the transfer, return line 16 is disconnected from the channel equipment, and transmission of C1 over return line 16 can safely resume without affecting any upstream spans. This occurs 26 microseconds after the energization of line 76B, i.e., a total of 46 microseconds following the initial fault detection.

The system is now stabilized in the transferred mode, with central office B sending code C1 over return line 16. Because of the $\overline{Q}$ signal from the now set transfer logic 88A OR'd through gate 114A, central office A also sends code C1 over forward line 14, although this latter transmission never reaches central office B due to the fault in line 14.

Twenty-one seconds after the transfer, timer 110A energizes its outputs and switches code transmission selector 70A to transmit code C2, and code receiver 56A to recognize only code C2. Timer 110B, however, does not switch because it is constantly reset by the incoming failure signal on line 60B. Therefore, central office B continues to send and to listen for code C1.

When the fault in line 14 has been cleared, the C2 transmission from central office A reaches code receiver 56B. However, inasmuch as code receiver 56B is still in the C1 mode, the C2 transmission goes unrecognized. Timer 110B, on the other hand, starts timing because there is no more incoming failure signal to reset it. If line 14 stays good for twenty-one seconds, timer 110B switches, and central office B now also sends and listens for code C2.

When code receivers 56A and 56B recognize code C2 for 30 microseconds (this occurs simultaneously in both central offices) the reset controls 116A, 116B are actuated to reset incoming failure flip-flop 62A, 62B and transfer logic flip-flop 88A, 88B. Resetting of these flip-flops returns all circuits to their normal condition.

Figure 5:
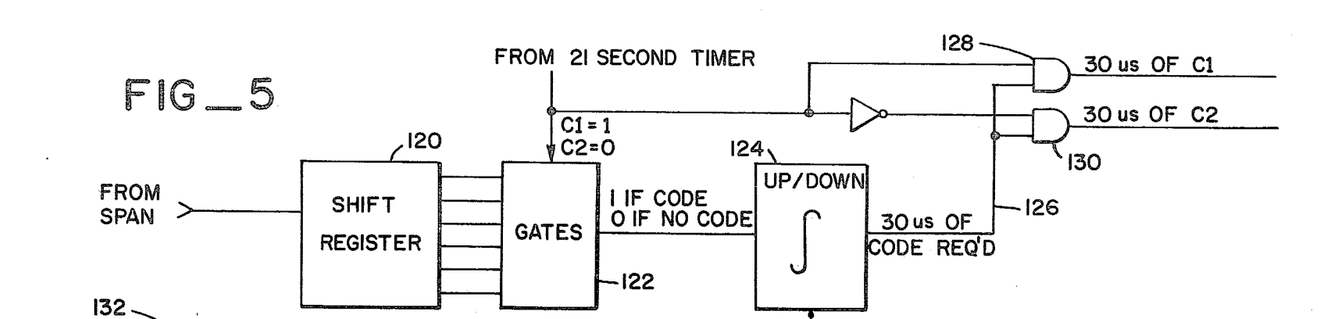
FIG. 5 is a detail block diagram showing the structure of the code receiver of FIG. 4.

The functioning of code receivers 56 is shown in more detail in FIG. 5. The incoming PCM signal from the span is applied to a shift register 120 whose parallel outputs are applied to logic gates 122. The output of timer 110 (FIG. 4) is normally "1", and it goes to "0" at the end of its 21-second timing interval. The gates of the logic 122 are so designed, in accordance with conventional practices, that the output of logic 122 is "1" when the shift register 120 contains the code indicated by the timer 110, and "0" when it does not.

In an uncoded pulse train, logic 122 will put out no more "1" pulses, on the average, than it does "0" pulses. Consequently, by applying the "1" output of logic 122 as an up-count to an integrating counter 124 and the "0" as a down-count, the integrating counter 124 will produce an overflow output on line 126 only when the desired code is consistently received for a predetermined length of time. The output 126 can be used, after gating through code selection gates 128, 130, as the 30 microsecond outputs of the code receiver 56. Similar circuitry is, of course, provided for the 10 microsecond and 20 microsecond outputs of code receiver 56.

Figure 6:
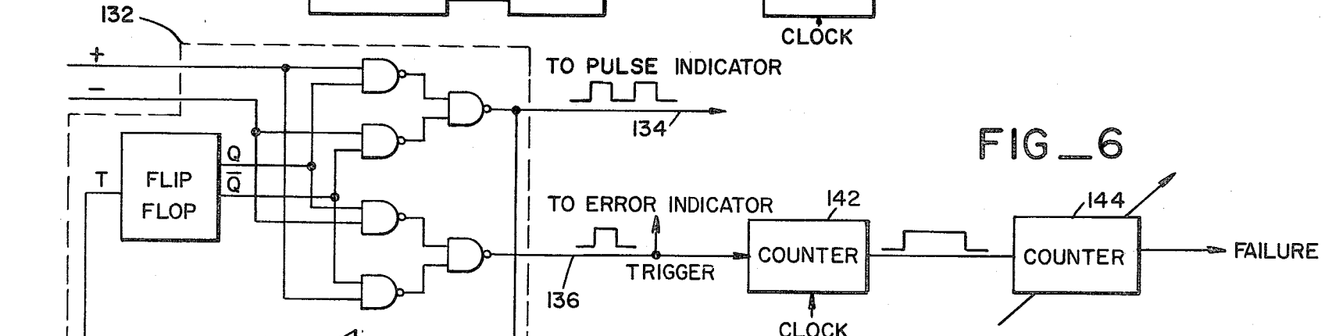
FIG. 6 is a detail block diagram showing the structure of the bipolar violation detector of FIG. 4.

The bipolar violation threshold detector 52 is shown in more detail in FIG. 6. The positive and negative rails of a two-rail bipolar PCM input from the span are combined in a combining logic 132 to put out pulses on line 134 when a positive pulse is always followed by a negative pulse and vice versa, and on line 136 when two pulses of the same polarity follow one another. Lines 134 and 136 carry, respectively, the signals applied to the "pulses" light 138 and the "errors" light 140 (FIG. 8).

Error pulses appearing on line 136 are applied to the counter 142. The counter 142 is arranged to be triggered by an error pulse to put out a logic "1" for a period of 512 clock pulses (about 300 microseconds). During this time the counter 142 is insensitive to further triggering. As a result, a short burst of a few hundred consecutive error pulses (typical of a transient malfunction) will put out only one pulse from counter 142.

The output of counter 142 is fed to counter 144, which responds to the count of sixteen 300-microsecond pulses in a given length of time. This length of time is adjustable so that the error rate constituting a failure indication can be varied at will. In practice, the shortest time used is on the order of 5 milliseconds, corresponding to an error rate of about $10^{-4}$. The output of counter 144 is the output, in FIG. 4, of bipolar violation threshold detector 52. To provide a switching hysteresis, the error rate for resetting timer 110 is to be one order of magnitude lower than the rate set for triggering a failure indication.

Returning to FIG. 4, it will be seen that the circuitry of FIG. 4 can be exactly alike for all span switch units 20 (FIG. 1) including the protective span units 20-P. In units 20-P, of course, there is no channel equipment to which lines 104A,B and 146A,B can be connected, and lines 104 and 146 are therefore connected, instead, to the protective span buses 22, 24. Conversely, in units 20-P, the electronic switches 106A,B and 108A,B are not connected to anything.

As long as the protective span is not in use, no signal appears on lines 146A, 146B. Consequently, the loss-of-signal detectors 26A, 26B (which are the monitors 26 of FIG. 1) of protective span switch units 20-PA and 20-PB enable gates 148A and 148B, respectively, and inject clock into the protective span 12-P as shown in FIG. 2a.

III. Automatic Test Looping Feature

The present invention greatly facilitates testing of a faulty line by providing an automatic test looping feature.

Figure 7:
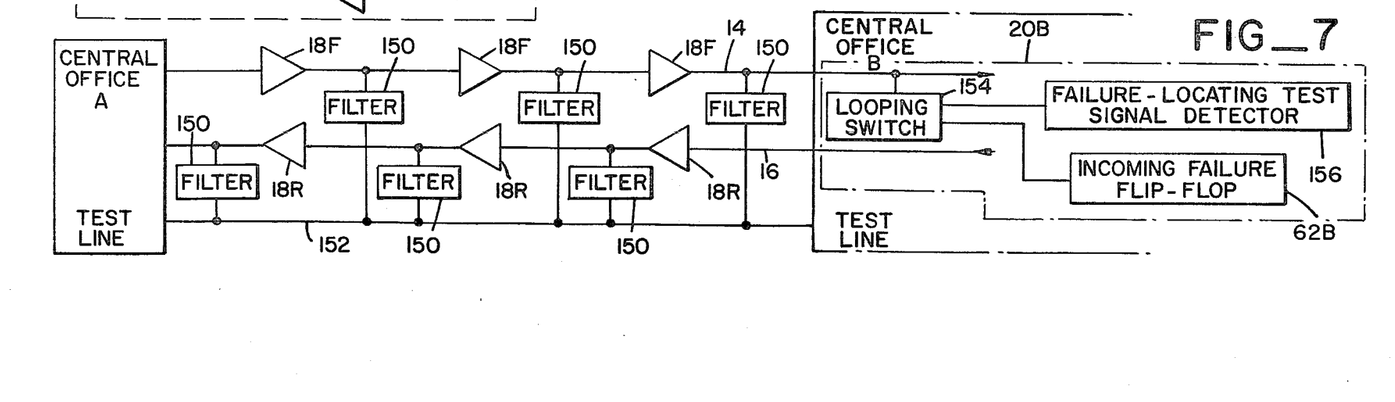
FIG. 7 is a schematic representation illustrating the automatic looping feature of the inventive device.

Referring to FIG. 7, a PCM span is conventionally tested by injecting into the line of test tone consisting of a pulse train containing bipolar violations at regular intervals, (commonly every 4th to 11th pulse). These bipolar violations are inserted in the positive direction for a given period of time (say 500 microseconds), then in the negative direction for an equal period of time. Integration of this pulse train produces an audio tone whose frequency is determined by this rate of alternation (e.g., in this instance, the tone would be a 2KHz tone).

Throughout the span, the output of each repeater 18F or 18R is connected through an intergrator-filter 150 to a test line 152. By monitoring the test line 152 while varying the frequency of the audio tone to accommodate, one by one, the various filters 150, the failed repeater 18F or 18R can be identified. In the past, this procedure had to be carried out separately from central office A for repeaters 18F and then from central office B for repeaters 18R, or the line had to be looped manually at the proper end.

In accordance with the invention, the testing for all six repeaters in FIG. 7 can be carried out from either central office without assistance at the other. For this purpose, the span switch unit 20B (shown, for clarity only, in central office B in FIG. 7, although an identical unit, not shown, also provided in central office A) is equipped with an electronic looping switch 154 which bridges the forward line 14 and the return line 16 when it is enabled both by signal from incoming failure flip-flop 62B indicating a failure in the return line 16, and by the test tone sensor 156.

The test tone sensor 156 is of conventional construction and does two things: (1) it continuously tests the pulse train for bipolar violation rates greater than one violation for each fifty pulses; and (2) it continuously tests the pulse train for the occurrence of bipolar violations alternating in polarity at an audio frequency. If both conditions are met, an enabling signal is transmitted to the looping switch 154.

IV. Priority System

The priority system of this invention is designed to perform two basic functions: (1) to establish a built-in priority scheme in which the protective span, in case of a multiple failure, is always accessible to the highest-priority failed service span, even though this means disconnecting a failed service span of lower priority from an already-seized protective span; and (2) to make it possible, without any service interruption, to substitute a selectable priority scheme for the built-in scheme.

For example, consider that in a central office of a large city, a set of PCM line equipment is arranged on its rack as shown in FIG. 8. The 12 channel units are shown at 160-1 through 160-12, while the corresponding span line switches are shown at 20-1 through 20-12, the switch for the protective span being designated as 20-P. Let it next be assumed that the PCM cable under consideration carries an FAA channel linkage, e.g., a control tower to a radar site, a toll channel, an extended area service channel, and some local channels. The priorities are as follows: FAA first, toll second, extended area service third, and local service last.

It will be readily recognized that in order to avoid confusion in installation and maintenance, the logical way of doing things is to connect each channel unit straight to the span line switch directly above it. If the FAA line is connected to channel 1, the toll line to channel 2, and the EAS line to channel 3, the built-in priority of the invention takes care of the situation as hereinafter described, and no special priority system is required. However, this is not usually a practical way of doing things, and in a typical installation, the FAA line may be connected to channel 4, the toll line to channel 12, and the EAS line to channel 1, with local lines on all other channels.

Figure 9:
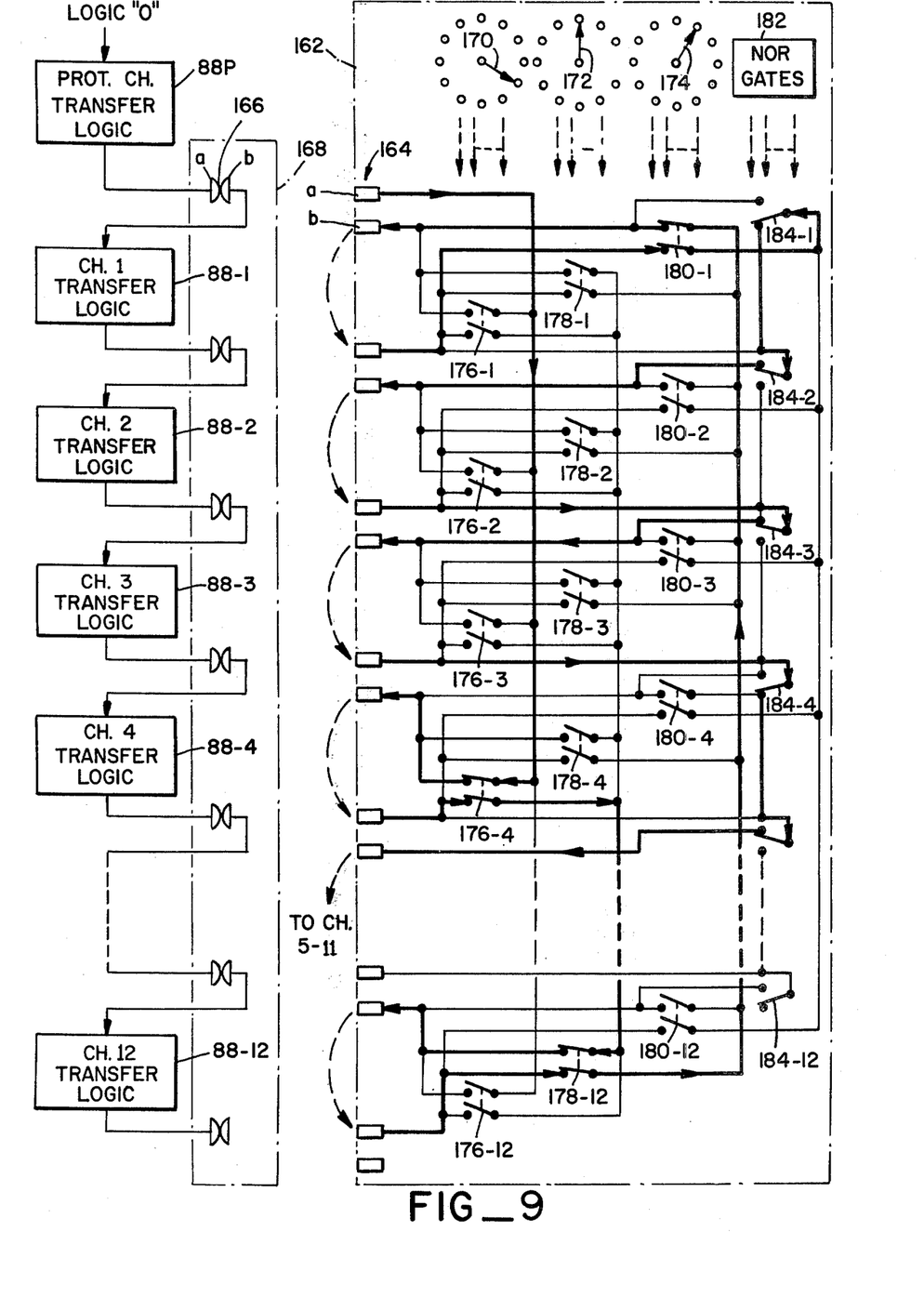
FIG. 9 is a schematized circuit diagram showing the priority selector of this invention.

For this reason, it is usually desirable to incorporate into (or add to) the system a selectable priority arrangement as shown in FIG. 9. This arrangement preferably takes the form of a printed circuit card 162 whose terminals 164 can be inserted between the normally closed contacts 166 of a connector 168 in the rack.

Looking first at the left side of FIG. 9, the built-in priority arrangement of the invention is simply a "daisy chain" in which control goes to the highest logic which chooses to exercise control. Specifically, each switching unit of the span line switch (including the protective span unit) contains a transfer logic 88 whose functioning has been described hereinabove. Suffice it to say at this point that whenever a transfer logic 88 transfers its channel to the protective span, its output in the daisy chain of FIG. 9 goes to logic "1" regardless of the logic level of its input. As long as the channel is connected to its own span, the output logic level of its transfer logic 88 is the same as its input logic level. Conversely, no switching unit can effect a transfer unless the input of its transfer logic 88 is at logic "0".

Consequently, in the absence of the priority card 162, the highest transfer logic which has transferred takes control and disables all lower logics by sending a logic "1" down the daisy chain. If a still higher transfer logic decides to transfer, it will take control and reset the logic previously in control by feeding the previously controlling transfer logic a "1".

When it is desired to modify the built-in priority, the priority card 162 shown on the right side of FIG. 9 is inserted into the connector 168, where the contacts 166 are opened and their a and b sides, respectively, connected to the corresponding a and b terminals on the card 162. A plurality of priority selectors 170, 172, and 174 are provided on the card 162 (three are shown in FIG. 9) to select the channel having first, second, and third priority, respectively. The first priority selector 170 operates the double-pole, single-throw first-priority switches 176-1 through 176-12, one of them for eachpposition of first-priority selector 170. (It will be understood that switches 176-1, 176-2, 176-3 and 176-12 are shown in symbolic form in FIG. 9, and that in reality they would normally be electronically operated solid-state gates such as field-effect transistors or the like.)

In like manner, the second-priority selector 172 operates the second-priority switches 178-1 through 178-12, and the third-priority selector 174 operates the third-priority switches 180-1 through 180-12. NOR gates 182 are controlled by the priority selectors 170, 172 and 174 and are arranged to operate (in an upward direction in the symbolic representation of FIG. 9) all those of the bypass switches 184-1 through 184-12 which are associated with a channel that has not been selected for either first, second or third priority.

With this in mind, the daisy chain modified to give first priority to channel 4 (the FAA line), second priority to channel 12 (the toll line), and third priority to channel 1 (the EAS line), operates as shown in heavy lines on card 162 of FIG. 9, the priority selectors being set to operate their associated priority switches and bypass switches as shown.

It at some future time it becomes necessary, for example, to temporarily allocate channel 3 to a top-priority military circuit, the priorities can be simply changed by removing card 162 from the rack (during which time the built-in priority takes over without any service disruption), moving the priority selectors 170, 172 and 174 to positions 3, 4 and 13 respectively, and reinserting the card 162 into the rack. It will be noted, incidentally, that in doing so the EAS line (channel 1) retains its priority over the local circuits because it is the highest of the non-selected channels.

It should be noted that if the protective span fails, its transfer logic operates as described hereinabove although its operation has no effect on the channel circuits. By doing so, the transfer logic 88-P puts out a logic "1" and prevents the service channels from effecting a transfer.

V. Code Generation System

Figure 10:
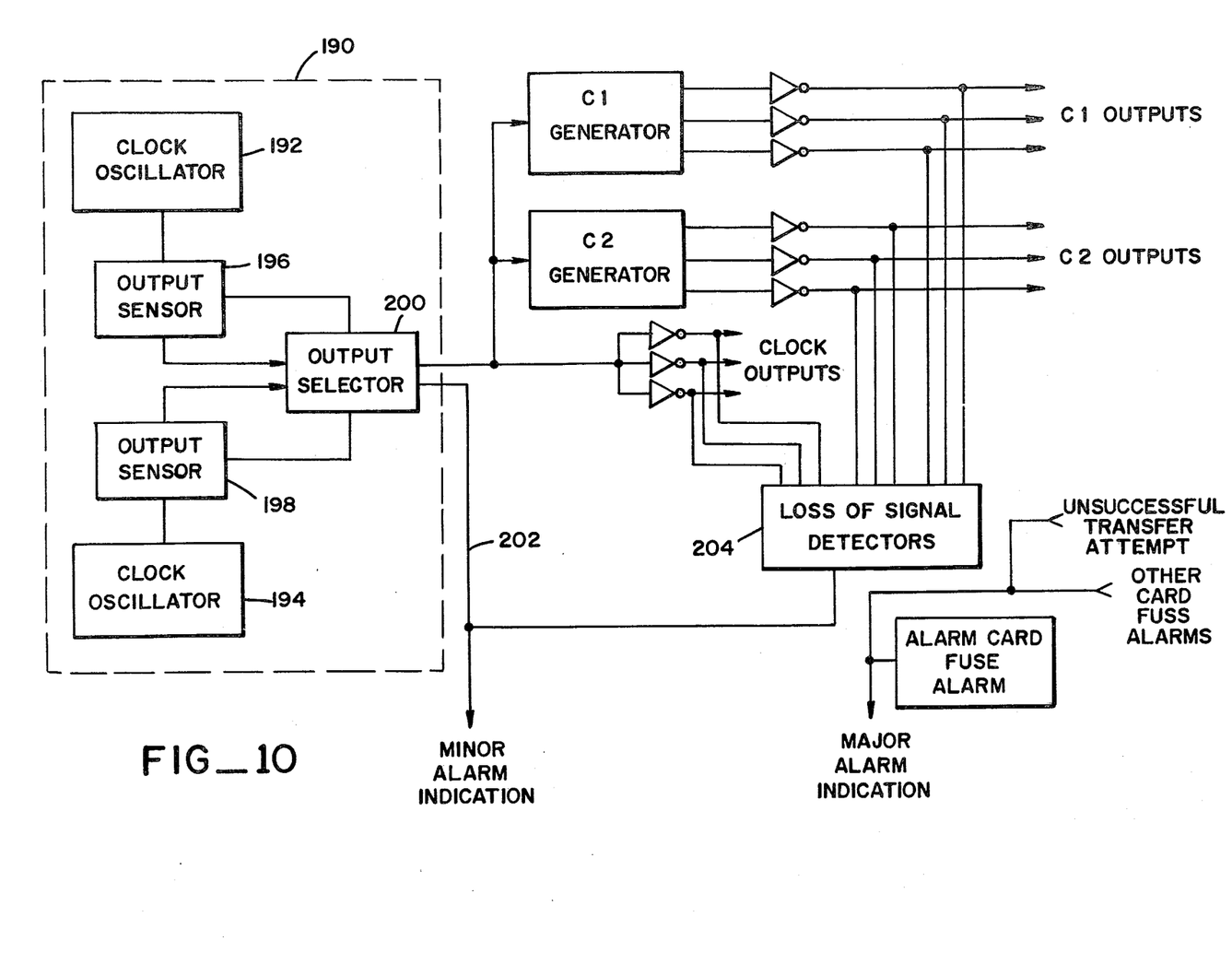
FIG. 10 is a block diagram of the common equipment of the span switch set of FIG. 8.

As shown in FIG. 10, the device of this invention derives its clock and code signals from a master oscillator unit 190. The unit 190 contains a pair of oscillators 192, 194 which are independently operable. Each oscillator is continuously tested by an output sensor 196 or 198, and its output is conveyed to output selector 200. The output selector 200 is essentially a flip-flop circuit which originally sets at random in either mode and is triggered into the other mode by a lost-output signal from the output sensor for the mode in which it is currently operating.

Consequently, the inventive device has redundancy in its clock generating capability, with an automatic switchover to another oscillator if the oscillator in use fails. An oscillator failure is therefore not a traffic-interrupting malfunction, and the output signal on line 202 to the minor alarm indicator 204 (FIG. 8) when either output sensor 196 or 198 produces a lost output signal.

Each clock output and each code output is separately monitored for loss of signal by a bank of loss-of-signal detectors, any one of which also triggers a minor alarm when activated.

Major alarms are traffic-interrupting conditions such as an unsuccessful transfer attempt (as indicated by the output of a gate 94 in FIG. 4) or a blown fuse. These light the major alarm light 206 (FIG. 8) and to summon maintenance personnel by conventional means.

What is claimed is:

1. An electronic span line switch for a telephone system including at least one service span and at least one protective span, each span including a separate transmission line for each direction of signal transmission and forming part of a telephone communications path in said telephone system, comprising:
    monitoring means for sensing a failure of one of said transmission lines in a service span;
    code transmitting means associated with said monitoring means for conveying over the other transmission line of the failed service span a first word of valid code representative of the occurrence of said failure, and code receiving means connected to said service span and responsive to the receipt of said code work transmitted over said service span;
    means associated with said monitoring means and said code receiving means for transferring, at each end of said service span, the telephone communications path carried by said service span to a protective span upon either the sensing of said failure or the receipt of said first code word;
    means for transmitting a second and different word of valid code over both lines of said service span when said service span communications path has been transferred to said protective span; and
    means for simultaneously resetting said service span communications path to its original position when said second code word is received and sent by both ends of said service span following removal of said failure.

2. In a telephone system including a plurality of spans connected in series through a plurality of central offices, each span being a segment of a telephone channel and including a separate span line for each direction of signal transmission along said system, the improvement comprising:
    span line switching means for ends of said span;
    means associated with said span line switching means for transmitting switching signals over said spans to switch one of said spans to a protective span after a predetermined interval following the occurrence of a fault therein; and
    means associated with said span line switching means for preventing spans in which no fault has occurred from switching in response to said switching signals,
    said last-named means being adapted to cause a line failure indication for the channel of which the faulted span is a part, to be recorded at each of said central offices on said system in both directions from said fault.

3. The improvement of claim 2, in which said last-named means include:
    means for transmitting switching signals indicative of a span line failure over said telephone system in both directions when a failure is detected, for a period of time at least sufficiently long to cause failure indications to be recorded by the central offices of a system in both directions from the point of failure;

means for impeding the transmission of said failure-indicating switching signals in the direction in which the failure occurred before sufficient time has elapsed to allow switching of the failed span to a protective span to occur; and means for blocking a received failure-indicating switching signal from being propagated through said span line switching means after a predetermined time following the initial receipt of said signal, said predetermined time being insufficient to allow switching of a nonfailed span to a protective span to occur.

4. A variable-priority span line switch, comprising:
a plurality of service spans and a protective span;
span switch means associated with said spans and including a plurality of transfer logic means for selectively transferring individual ones of said serivce spans to said protective span in accordance with a predetermined priority; and
means for establishing said priority, said priority-establishing means including:
1. interconnecting means for connecting said transfer logic means to one another in a predetermined sequence;
2. means associated with said transfer logic means for transmitting a transfer enabling signal along said interconnecting means until it encounters the transfer logic of a transferred span, and a transfer disabling signal from that point on; and
3. switching circuit means arranged to selectively alter the position of one or more of said transfer logic means in said sequence.

5. The device of claim 4, in which said switching circuit means are arranged to be removably inserted into said interconnecting means between each of said transfer logic means, said priority being in accordance with said predetermined sequence in the absence of said switching circuit means, and in accordance with the selection setting of said switching circuit means in the presence of said switching circuit means.

6. A method of effecting a span line transfer comprising the steps of:

a. detecting, at one end of a span, which at that end consists of an incoming and an outgoing span line, a failure of the incoming span line;
b. transmitting a failure-indicating word of valid code over the outgoing span line of the same span;
c. sensing, at the other end of said span, the receipt of said failure-indicating code word;
d. using said failure detection to effect a transfer of said span at said one end; and
e. using said failure-indicating code word receipt to effect the transfer of said span at said other end.

7. The method of claim 6, further comprising the following steps to effect a resetting of the transferred span:
f. transmitting separately over each of said span lines a restorability-indicating word of valid code when and only when no failure has been detected on the other span line for at least a predetermined length of time; and
g. using, at each end of said span, the simultaneous transmission and receipt of said restorability-indicating code word to effect the resetting of said span at that end.

8. The method of automatically transferring a service span channel to a protective span upon occurrence of a service span failure comprising the steps of:
a. detecting a failure on said service span;
b. transmitting, in response to said failure detection, coded switching information in the form of valid code words over said service span; and
c. using said coded switching information to effect the transfer of said channel.

9. The method of automatically transferring a service span channel to a protective span upon occurrence of a service span failure and of resetting the same upon clearance of said failure, comprising the steps of:
a. detecting the occurrence and the clearance of a failure on said service span;
b. transmitting, in response to said failure occurrence and clearance detections separate and different coded switching information in the form of a valid code words over said service span; and
c. using said coded switching information to effect the transfer and resetting of said channel.

* * * * *

UNITED STATES PATENT AND TRADEMARK OFFICE
CERTIFICATE OF CORRECTION

PATENT NO. : 3,983,340
DATED : September 28, 1976
INVENTOR(S) : PAUL J. LIMA et al It is certified that error appears in the above-identified patent and that said Letters Patent are hereby corrected as shown below:

Column 12, claim 1, line 23 - "work" should read --word--.

Column 14, claim 9, line 40 - delete "a" before "valid".

Signed and Sealed this

Fifteenth Day of March 1977

[SEAL]

Attest:

RUTH C. MASON
*Attesting Officer*

C. MARSHALL DANN
*Commissioner of Patents and Trademarks*